March 18, 1958
Q. H. JENKINS
2,827,016
PORTABLE LOADING CHUTE
Filed Jan. 28, 1955
2 Sheets-Sheet 1
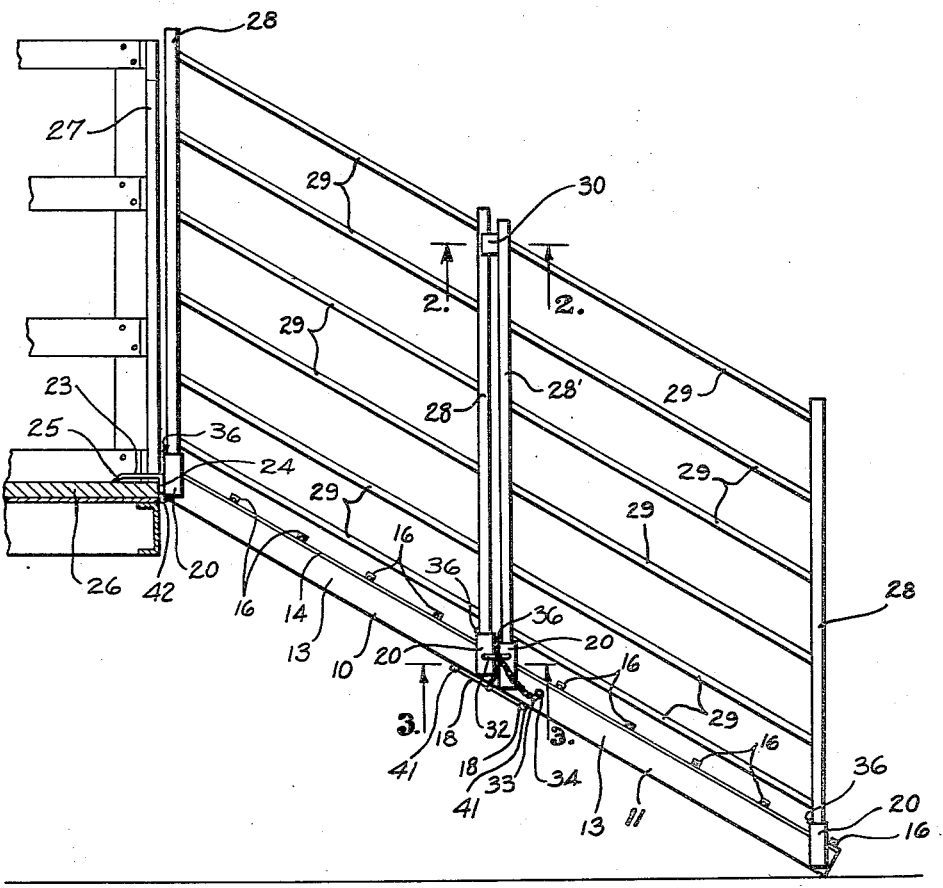
Fig. 1.
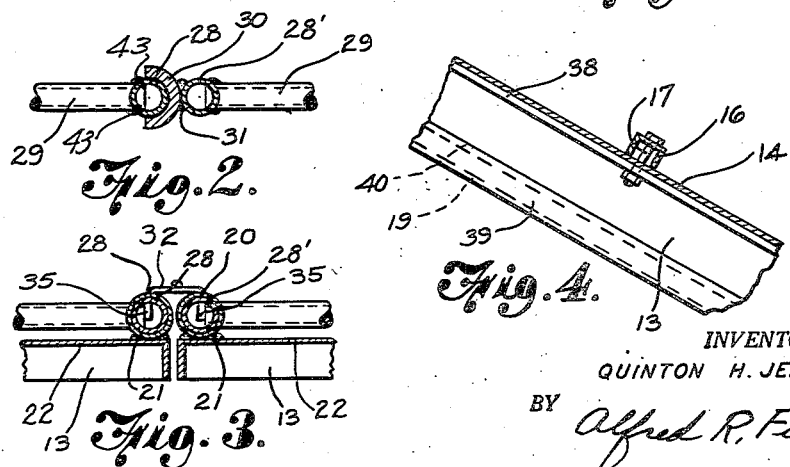
Fig. 2.
Fig. 3.
Fig. 4.
INVENTOR.
QUINTON H. JENKINS
BY Alfred R. Fuchs
ATTORNEY March 18, 1958 — Q. H. JENKINS — 2,827,016
PORTABLE LOADING CHUTE
Filed Jan. 28, 1955 — 2 Sheets-Sheet 2
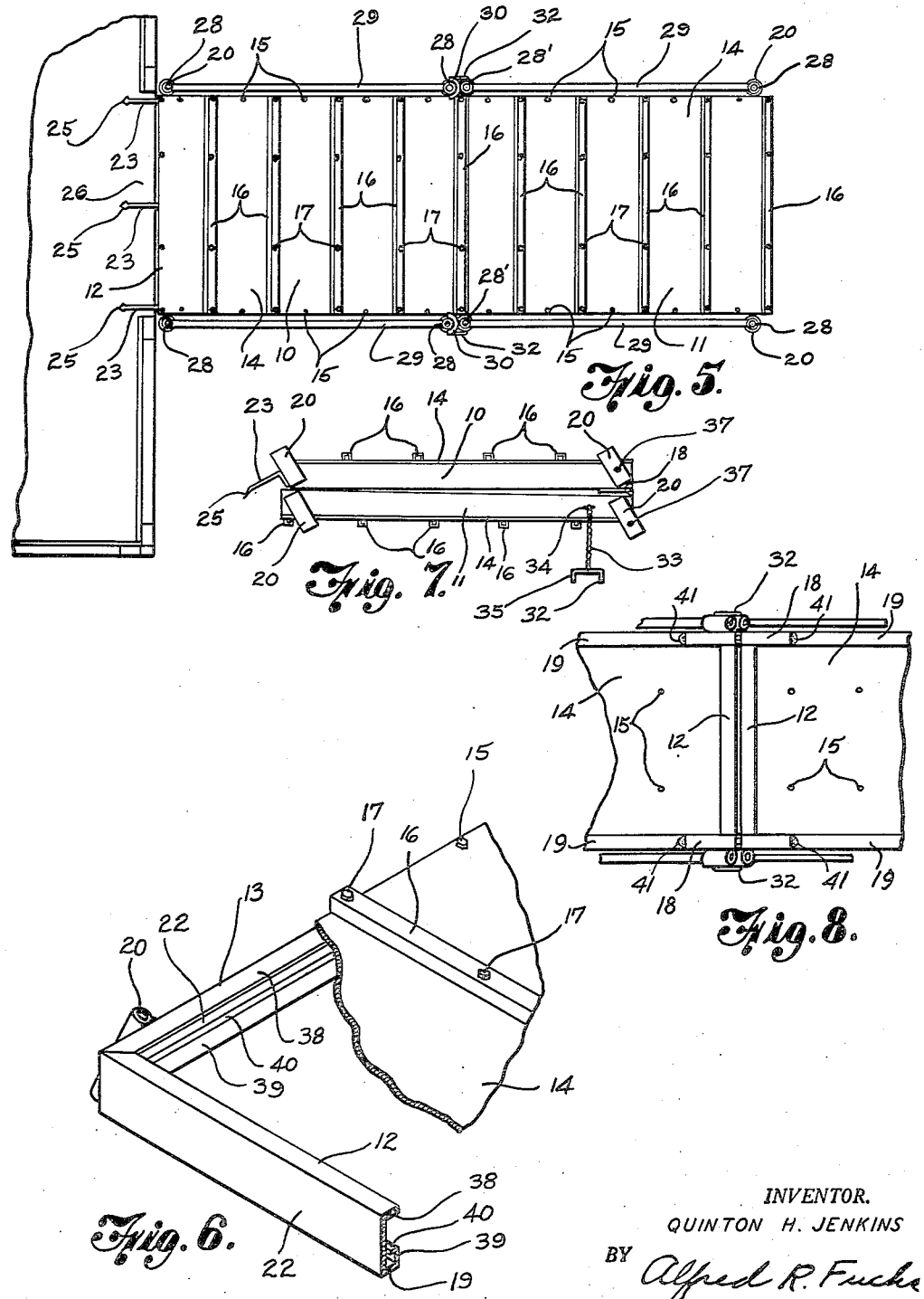
INVENTOR.
QUINTON H. JENKINS
BY Alfred R. Fuchs
ATTORNEY

United States Patent Office 2,827,016
Patented Mar. 18, 1958

2,827,016

PORTABLE LOADING CHUTE

Quinton H. Jenkins, Clinton, Okla.

Application January 28, 1955, Serial No. 484,806

7 Claims. (Cl. 119—82)

My invention relates to portable loading chutes, and more particularly to a loading chute of the above referred to character that is light in weight and capable of being readily transported from place to place.

More particularly my invention comprises a loading chute comprising a pair of hingedly connected bottom sections and side sections that are detachably mounted on said bottom sections when the chute is assembled, making it possible to detach the side sections from the bottom sections and fold the bottom sections so that the various sections can be put in a truck or similar vehicle for transporting the same from one location to another without taking up any large amount of room in the truck.

The structure is of such a character that when the side members are assembled with the bottom sections said side members brace the bottom sections, each taking a portion of the load so that the entire chute is stiffened and the sides are held rigidly in position. At the same time the side members, there being a pair thereof on each side of the chute, are interchangeable and are separable from the chute and from each other so that the device can be readily stacked in a relatively small package for shipment. The side members have no moving parts, thus avoiding the necessity of replacements due to wear.

The bottom section is provided with a frame that has a metal floor fastened thereto and is provided with suitable cleats for preventing slippage of the animal traveling over the same on the metal flooring. Thus the bottom section comprises a ramp that is collapsible, being foldable into a compact unit by the hinging means that connect the sections together for swinging about an axis extending transversely of the units. Furthermore, due to the fact that the ramp portion of the chute can be folded on itself, where a short chute is only necessary, only half of the chute can be used by folding the lower ramp section under the upper ramp section and omitting one side member of each pair.

It is a further purpose of my invention to provide a loading chute that is adapted to be assembled or disassembled with ease, it being possible to assemble it on the ground and then place it in position on the carrier, such as a truck or semi-trailer, or box car, by one man, or the floor or ramp section can be placed on the carrier and the sides of the chute placed in proper position by one man in a similar manner.

It is a further purpose of my invention to provide a chute of the above mentioned character that is provided with side sections that are made up of tubular posts and tubular connecting members fixed to each other and to provide sockets in said bottom sections for receiving the posts, and further to provide means for holding said side sections and bottom sections in assembled connected relation, comprising U-shaped members that are mounted on the bottom sections and are adapted to engage aligning openings in the posts and sockets when the posts are mounted in the sockets to hold said posts in assembled position in said sockets and the ramp or floor sections from relative swinging movement.

It is also a purpose of my invention to provide means for holding the longitudinally adjacent side sections in alignment with each other, said means being provided in the form of a socket on the post at the end of one of said sections, which is adapted to receive longitudinally the post in the adjacent end of the other section of said pair.

Other objects and advantages of my invention will appear as the description of the drawings proceeds. I desire to have it understood, however, that I do not intend to limit myself to the particular details shown or described, except as defined in the claims.

In the drawings:

Fig. 1 is a side elevational view of my improved loading chute, showing the same mounted on a carrier, a fragment of said carrier being shown.

Fig. 2 is a fragmentary section taken on the line 2—2 of Fig. 1 on an enlarged scale.

Fig. 3 is a fragmentary section taken on the line 3—3 of Fig. 1 on an enlarged scale.

Fig. 4 is a fragmentary section through the ramp member on an enlarged scale, taken longitudinally thereof.

Fig. 5 is a top plan view of the chute and fragmentary portion of the carrier shown in Fig. 1

Fig. 6 is a fragmentary perspective view of the bottom or ramp section.

Fig. 7 is a side elevational view of the ramp section in folded condition, and

Fig. 8 is a fragmentary bottom plan view of the bottom or ramp section.

Referring in detail to the drawings, my improved loading chute comprises a ramp made up of a pair of bottom sections 10 and 11, each of which comprises a frame made up of transversely extending members 12 and longitudinally extending members 13, upon which sheet metal flooring 14 is detachably mounted by means of suitable fastening elements, such as the bolts 15, and which are provided with cleats 16 that are bolted onto the frame members and flooring 14 by means of suitable fastening elements, such as the bolts 17. Said cleats, it will be noted upon reference to Fig. 4, are inverted channel or U-shaped in cross section members that have the flanges thereof engaging at their edges with the flooring 14. The sections 10 and 11 are hinged together at their adjoining ends, having hinge members 18 welded to the bottom flanges 19 of the frame members 12 and 13 at the corner portions of the adjoining ends of said bottom sections 10 and 11, as shown at 41.

Each of the sections 10 and 11 has tubular socket members 20 mounted at the opposite ends thereof in fixed position, being welded thereto as shown at 21 in Fig. 3. Said tubular sockets 20 are welded to the web portions 22 of the members 13, as will be obvious from Fig. 3, and it will be noted upon reference to Fig. 1 that these socket members 20 extend at an oblique angle to the frame members 13, the angle between said sockets and longitudinal frame members being approximately 31° in the form of the invention shown. The socket members 20 are open both at the top and bottom thereof. The socket members are so located that when the sections 10 and 11 are folded on each other by swinging the sections toward each other from the position shown in Fig. 1 to that shown in Fig. 7 the socket members 20 and the cleats 16 will not in any manner interfere with the folding of the two sections of the ramp on each other with the bottom flanges of the frame members in face to face engagement. The section 10 is provided with a plurality of hooks 23 that have downwardly turned end portions 24 that are welded, as shown at 42, to the upper transverse frame member 12 of said section 10, said hooks being made up of rods that are bent to the desired form, having obliquely downwardly extending flattened hook ends 25 engaging the floor or bed 26 of the carrier 27, there being preferably one of said hooks 23 at the mid-portion of the transverse member 12 and one at each end thereof so as to provide a hook at the middle portion and at the opposite marginal sides of the chute for mounting the chute on the carrier.

The sides of the chute are made up of upper and lower side sections, which are interchangeable. The upper side section of each pair is provided with a pair of tubular posts 28, to which are secured the longitudinally extending tubular members 29, preferably by welding said tubular members 29 in openings in the posts 28, as shown at 43. The members 29 extend at an oblique angle to the posts 28, the same angular relationship between the axis of the tubular members 28 and 29 existing as between the longitudinal frame members 13 and the sockets 20. The lower side section of each pair is provided with a tubular post 28, such as the posts 28 on the upper side section of each pair, and with a tubular post 28', which is the same in construction as the post 28, except for the fact that a concavo-convex or U-shaped socket member 30 is welded to the member 28' and receives the member 28 of the upper section adjacent thereto, the weld being indicated at 31 in Fig. 2. Thus a semi-cylindrical or U-shaped socket is provided on the post 28', which has its axis of curvature extending parallel to the axis of the post 28' and of a character to receive the post 28 so as to hold the two side sections in alignment with each other. The longitudinal tubular members 29 of the lower side section of each pair are mounted on the posts 28 and 28' in a similar manner and have the same angular relation to the posts as the members 29 of the upper side section have to the posts 28 thereof.

A U-shaped locking member 32 is mounted on each of the longitudinal frame members 13 of the lower bottom section 11 of the chute, being secured thereto by means of a flexible member, such as a chain 33, which is secured to an eye 34 provided on each of said members 13. The locking member 32 has a pair of parallel legs 35 that fit in aligning openings 37 in the tubular posts 28 and 28', and the sockets 20 in which said posts are mounted. Projections, such as welds 36, are provided on the posts 28 and 28' engaging the upper ends of the sockets 20 for aligning the openings in said posts and sockets that receive the legs 35 of the locking members and to position the bottom longitudinal members 29 in spaced relation to the floor.

The frame members 12 and 13 are preferably made of the cross sectional shape shown in Fig. 6, having a web portion 22, a bottom flange 19 and a top flange 38. The bottom flange 19 has an upstanding flange 39 thereon which flange 39 has an inturned flange 40 thereon. Said bottom flange is made as shown in order to stiffen and strengthen the frame.

In setting up the chute for use in the ordinary manner the two bottom sections 10 and 11 are moved into alignment by swinging the same about the axis of the hinges 18 and the posts 28 and 28' are inserted in the sockets 20. After this has been done the legs 35 of the U-shaped members 32 are inserted in the aligning openings in the sockets 20 and posts 28 and 28' that are within these sockets. Whether the assembly is accomplished with the members 10 and 11 in an inclined position and the hooks 23 in engagement with a vehicle, as shown in Fig. 1, or whether this assembly is accomplished with the parts 10 and 11 on the ground, the procedure is the same. The locking members 32 prevent any undue stress being applied to the hinge pins when the apparatus is in use, the load supported by the chute being transferred to the locking members 32 and to the cross members 12 at the adjacent ends of the sections 10 and 11. Furthermore the entire structure is strengthened and stiffened by the provision of the side members, as the engagement of the post 28 in the socket 30 on the post 28' at each side of the chute will cause a portion of the load on the chute to be transferred to each of said pairs of side members.

If a shorter chute is only required, such as where a vehicle that is provided with a lower bed than that illustrated in Fig. 1 is to be loaded or unloaded, the two bottom sections 10 and 11 are folded on each other, as illustrated in Fig. 7, and with the hooks 23 in engagement with the vehicle in a similar manner to that illustrated in Fig. 1, only the one set of side sections, that is, one side section of each pair, is utilized, assembled with the section 10 in the same manner as previously described, the section 11 remaining in folded under position when the device is so used.

When the apparatus is to be placed in a vehicle for hauling from one location to another the entire device can be arranged in a compact stack by folding the bottom sections 10 and 11, as shown in Fig. 7, and the side sections can then be stacked in horizontal position on top of the folded bottom portion of the chute.

In Fig. 1 the thickness of the material of the portion 24 of the hook 23 is exaggerated. In actual practice the post 28 will be closely adjacent the vehicle and will engage with the vehicle at the upper end thereof when the apparatus is in use and the portions 24 of the hooks are in engagement with the vehicle at the floor portion of the chute.

What I claim is:

1. A loading chute comprising a pair of bottom sections hingedly connected together for swinging movement about a transverse axis, pairs of side sections, and means for independently detachably mounting each of said side sections on a bottom section comprising sockets on each of said bottom sections at opposite ends thereof and posts on each of said side sections at opposite ends thereof detachably mounted in said sockets and means engaging the posts and sockets at adjacent ends of said side sections for holding said bottom sections from relative swinging movement.

2. A loading chute comprising a pair of bottom sections hingedly connected together for swinging movement about a transverse axis, pairs of side sections, and means for independently detachably mounting each of said side sections on a bottom section comprising sockets on each of said bottom sections at opposite ends thereof and posts on each of said side sections at opposite ends thereof detachably mounted in said sockets, the post at the end of one of the side sections of each pair having a socket member thereon receiving the post at the adjacent end of the other side section of said pair and means engaging the posts and sockets at adjacent ends of said side sections for holding said bottom sections from relative swinging movement.

3. A loading chute comprising a pair of bottom sections comprising rigid, rectangular, metallic frames having metal flooring secured on one side thereof and hingedly connected together for swinging movement about a transverse axis on the opposite side thereof, pairs of side sections, and means for independently detachably mounting each of said side sections on a bottom section comprising sockets on each of said bottom sections at opposite ends thereof and posts on each of said side sections at opposite ends thereof detachably mounted in said sockets, and means engaging the posts and sockets at adjacent ends of said side sections for holding said bottom sections from relative swinging movement.

4. A loading chute comprising a pair of bottom sections hingedly connected together for swinging movement about a transverse axis, pairs of side sections, and means for independently detachably mounting each of said side sections on a bottom section comprising tubular sockets on each of said bottom sections at opposite ends thereof and tubular posts on each of said side sections at opposite ends thereof detachably mounted in said sockets and locking members engaging the posts and sockets at adjacent ends of said side sections for holding said bottom sections from relative swinging movement.

5. A loading chute comprising a pair of bottom sections hingedly connected together for swinging movement about a transverse axis, pairs of side sections, and means for independently detachably mounting each of said side sections on a bottom section comprising sockets on each of said bottom sections at opposite ends thereof and tubular posts on each of said side sections at opposite ends thereof detachably mounted in said sockets, the post at the end of one of the side sections of each pair having a concave socket member extending lengthwise thereof at its upper end receiving the post at the adjacent end of the other side section of said pair and locking members engaging the posts and sockets at adjacent ends of said side sections for holding said bottom sections from relative swinging movement.

6. A loading chute comprising a pair of bottom sections hingedly connected together for swinging movement about a transverse axis, pairs of side sections, and means for independently detachably mounting each of said side sections on a bottom section comprising tubular sockets on each of said bottom sections at opposite ends thereof and tubular posts on each of said side sections at opposite ends thereof detachably mounted in said sockets and a U-shaped bracing member engaging in aligning openings in the posts and said sockets at adjacent ends of said bottom sections.

7. A loading chute comprising a pair of bottom sections hingedly connected together for swinging movement about a transverse axis, pairs of side sections, and means for independently detachably mounting each of said side sections on a bottom section comprising obliquely extending tubular sockets on each of said bottom sections at opposite ends thereof and posts on each of said side sections at opposite ends thereof detachably mounted in said sockets and locking members engaging the posts and sockets at adjacent ends of said side sections for holding said bottom sections from relative swinging movement.

References Cited in the file of this patent
UNITED STATES PATENTS

| | | |
|---|---|---|
| 788,424 | Ochs | Apr. 25, 1905 |
| 1,384,713 | Stephens | July 12, 1921 |
| 1,733,517 | Siddens | Oct. 29, 1929 |
| 1,782,554 | Tool | Nov. 25, 1930 |

FOREIGN PATENTS

| | | |
|---|---|---|
| 383,685 | Great Britain | Nov. 24, 1932 |